United States Patent [19]

Gerlitz et al.

[11] Patent Number: 5,090,708

[45] Date of Patent: * Feb. 25, 1992

[54] NON HAND-HELD TOY

[76] Inventors: Yonatan Gerlitz, 23 Malchei Israel Street, Herzliya; Dan Moran, 19 Aluf David Street, Ramat Chen, Ramat Gan; Roni Raviv, 9a/8 Maccabi Street, Ness Ziona, all of Israel

[*] Notice: The portion of the term of this patent subsequent to Jan. 29, 2008 has been disclaimed.

[21] Appl. No.: 626,537

[22] Filed: Dec. 12, 1990

[51] Int. Cl.⁵ .................................................. F41J 5/08
[52] U.S. Cl. ..................... 273/310; 273/DIG. 1712 2; 434/22; 455/79; 455/82
[58] Field of Search ................................ 273/310-312, 273/DIG. 17; 434/22, 21, 323; 356/152; 455/82, 79; 250/216, 221

[56] References Cited

U.S. PATENT DOCUMENTS

| 3,294,401 | 12/1966 | Nicholas et al. | 273/311 |
| 4,209,255 | 6/1980 | Heynau et al. | 356/152 |
| 4,333,152 | 6/1982 | Best | 364/521 |
| 4,373,916 | 2/1983 | Ashford et al. | 434/22 |
| 4,583,950 | 4/1986 | Schroeder | 434/22 |

*Primary Examiner*—Benjamin Layno
*Attorney, Agent, or Firm*—Nixon & Vanderhye

[57] ABSTRACT

A toy including headgear mounted thereon a simulated weapon system, a visor, apparatus for indicating on the visor a sighting reference and non-hand actuated apparatus for producing simulated firing on a target. Preferably the headgear and the non-hand actuated apparatus are operative for producing simulated firing on a target which appears on a television screen in an interactive television game.

15 Claims, 8 Drawing Sheets

NON HAND-HELD TOY

FIELD OF THE INVENTION

The present invention relates to toys generally and more particularly to aiming and firing toys.

BACKGROUND OF THE INVENTION

Toy guns and other hand held firing toys of various descriptions are very popular with children. They are generally hand-operable and outwardly resemble guns with conventional triggers and sights. Toy guns which produce a radiation beam whose impingement on a target produces a sensible output indication are also known in the art.

A relatively recent development in this field is the interactive television game. Games of this type are marketed under the trademarks Nintendo, Atari and Sega and include various combat scenarios, including aerial combat and futuristic war. The input controls for interactive television games are usually buttons, joysticks and light-sensitive hand-held guns. In many cases the player uses a given single input control both for controlling the attitude of his simulated movement and for firing.

SUMMARY OF THE INVENTION

The present invention seeks to provide a novel electrooptically operated firearm toy which is preferably not hand held in operation.

There is thus provided in accordance with a preferred embodiment of the invention a firing toy including headgear having mounted thereon a simulated weapon system, a visor, apparatus for indicating on the visor a sighting reference and apparatus for producing simulated firing on a target. Preferably the headgear and the simulated firing apparatus are operative for producing simulated firing on a target which appears on a television screen in an interactive television game. There is also provided in accordance with an embodiment of the invention an interactive television game system including interactive television game apparatus, headgear having mounted thereon a simulated weapon system, a visor, apparatus for indicating on the visor a sighting reference; and apparatus for producing simulated firing on a target.

In accordance with a preferred embodiment of the invention, the firearm toy is in the form of headgear which is used to position a weapon system on targets which appear on a television screen in an interactive television game. Aiming is achieved by means of head movement, which enables the player to align crosshairs of a sight on the targets. Firing is preferably achieved by voice command. The overall attitude of a simulated platform on which the player is located is normally controlled by a separate, hand-operated joy-stick.

There is thus provided in accordance with a preferred embodiment of the invention a non hand held toy including apparatus for visual aiming on a target and apparatus establishing radiation communication between the target and the toy.

In accordance with a preferred embodiment of the present invention, the aiming apparatus comprises sighting reference projecting apparatus for projecting a sighting reference onto a visor disposed in front of the user so as to create a virtual image located substantially at the center of the user's field of view. The image of the sighting reference thus appears as though it were located at an infinite distance from the user.

The sighting reference projecting apparatus preferably comprises a source of visible light.

Further in accordance with a preferred embodiment of the present invention, the visor comprises a substantially transparent curved substrate having a pre-determined geometrical configuration, the visible light source being located at a pre-determined position on the focal plane of the inner surface of the substrate.

Further in accordance with a preferred embodiment of the present invention, the geometrical configuration of the curved substrate is a portion of a sphere.

Additionally in accordance with a preferred embodiment of the present invention, the transparent visor comprises a partially light-reflective coating on the inner surface thereof associated with a generally transparent relatively stiff curved substrate. The coating is operative to reflect light arriving thereat from the sighting reference projecting apparatus to the eyes of the user, thus creating a virtual image of the sighting reference.

Additionally in accordance with a preferred embodiment of the present invention, the coating is a dichroic coating and the substrate is formed from a polycarbonate material.

In accordance with a further preferred embodiment of the present invention, the coating is a neutral metallic coating.

In a preferred embodiment useful in the context of an interactive television game a light sensitive detector is employed to determine the alignment of a simulated weapon system on a target displayed on the television screen.

Preferably, the light sensitive detector is boresighted to the player's light of sight through the sighting reference, enabling the player to aim at the target by moving his head to line up the displayed target with the sighting reference projected on the headgear. The firing activation apparatus is preferably voice activated.

When the interactive game generates a target on the television screen and firing is activated by the player, a bright image, typically in the shape of the target, is generated on the television screen for a short period of time. If this bright image is detected by the light sensitive detector in the head gear, a "hit" is registered by the interactive game.

Further in accordance with a preferred embodiment of the present invention, the apparatus for emitting comprises an IR beam emitting apparatus and firing activation apparatus.

Additionally in accordance with a preferred embodiment of the present invention, the IR beam emitting apparatus is boresighted to the user's line of sight through the sighting reference, enabling the user to aim at the target by moving his head and lining up the target with the projected sighting reference.

Still further in accordance with a preferred embodiment of the present invention, the firing activation apparatus is voice activated.

Additionally in accordance with a preferred embodiment of the present invention, the toy also comprises apparatus for providing an output indication of IR beam impingement thereon including an IR sensor and indication providing apparatus for providing an indication that IR energy has impinged upon the IR beam sensor.

Further, in accordance with a preferred embodiment of the present invention, the IR sensor is sensitive to IR beams impinging thereupon from any direction.

In accordance with a preferred embodiment of the invention, the various elements of the toy are all mounted on headgear, with the possible exception of the IR sensor which may be remotely mounted.

BRIEF DESCRIPTION OF THE DRAWINGS

The present invention will be understood and appreciated more fully from the following detailed description, taken in conjunction with the drawings in which:

FIGS. 4 and 5 are block diagrams of electronic circuitry useful in a control unit in conjunction with the toy of FIG. 1; FIG. 4 showing firing activation means for activating an IRED driver circuit and FIG. 5 showing the IRED driver circuit forming part of the control unit of FIG. 2;

DETAILED DESCRIPTION OF A PREFERRED EMBODIMENT

According to a preferred embodiment, the present invention seeks to provide a non-hand operated toy operative for aiming at a target, "firing" a beam at the target and preferably also detecting beams impinging upon that target. The firearm toy is preferably integrally formed with a head helmet which may be designed to resemble in appearance the headgear of a fanciful character, such as one of the characters in existing "Star Wars" games.

Figure 1:
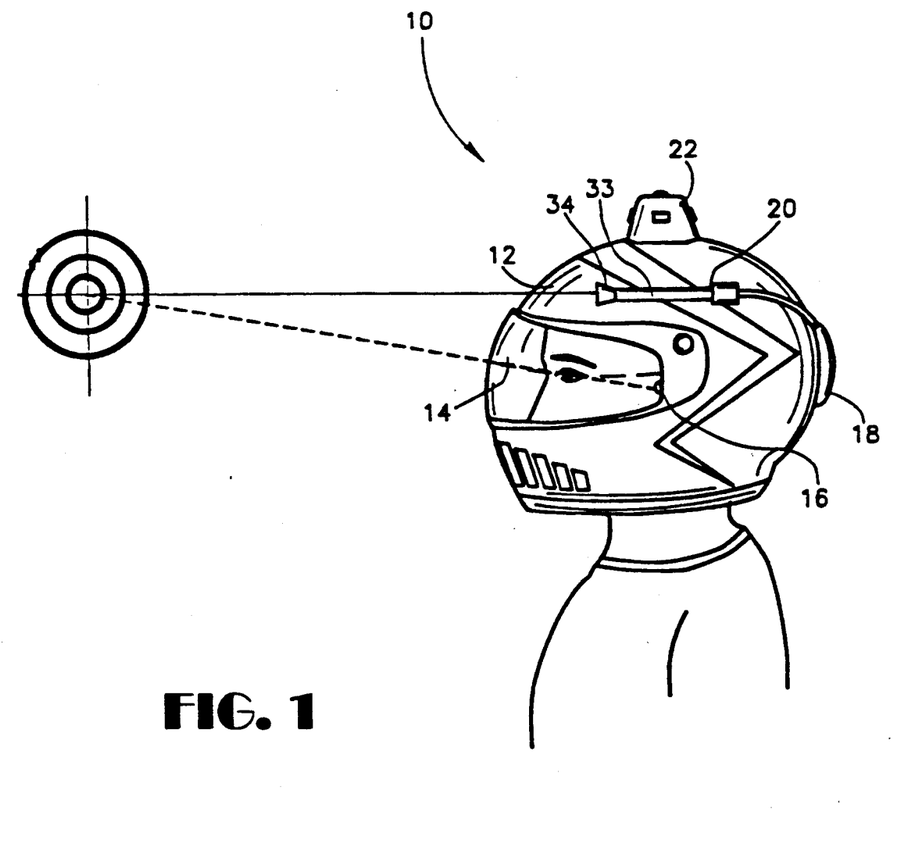
FIG. 1 is a pictorial illustration of a toy constructed and operative in accordance with a preferred embodiment of the present invention.

Reference is now made to FIG. 1, which is a pictorial illustration of a child wearing a helmet integrated firearm toy 10 constructed and operative in accordance with a preferred embodiment of the present invention. The toy is based on a helmet 12 which typically comprises a partially-transmissive partially-reflective visor 14. Although visor 14 enables the child to view his surroundings, it also reflects back to him, as though from an infinite distance, a sighting reference emitted by a visible light emitting diode 16.

A control unit 18 operates visible light emitting diode 16, which forms part of the sighting reference system, and also an IR light emitting diode (IRED) 20, such as the TRW-op 290 from TRW Corporation, which forms part of a firing unit 33 which includes also a collimating lens 34. Firing unit 33 is boresighted with the child's line of sight and is operative to allow the child to "fire" upon a target.

According to a preferred embodiment, the firearm toy also comprises a peripheral detection unit 22 which emits a signal, such as an audio or a visual signal, when impinged upon by a beam of IR light.

Detection unit 22 is preferably removably mounted on helmet 12. Thus, in a first preferred mode of play, two or more children, wearing helmets with detection units 22 mounted thereupon, can aim at and fire at one another. When a child succeeds in "hitting" a second child, an indicative signal, such as an audio or visual indication, is emitted by the detection unit 22 mounted upon the helmet worn by the second child. In a second preferred mode of play, one or more children wearing helmets can aim and fire at one or more detection units 22 which serve as practice targets, having been removed from the helmets and positioned in the children's surroundings, such as on the wall or on the floor.

Figure 2:
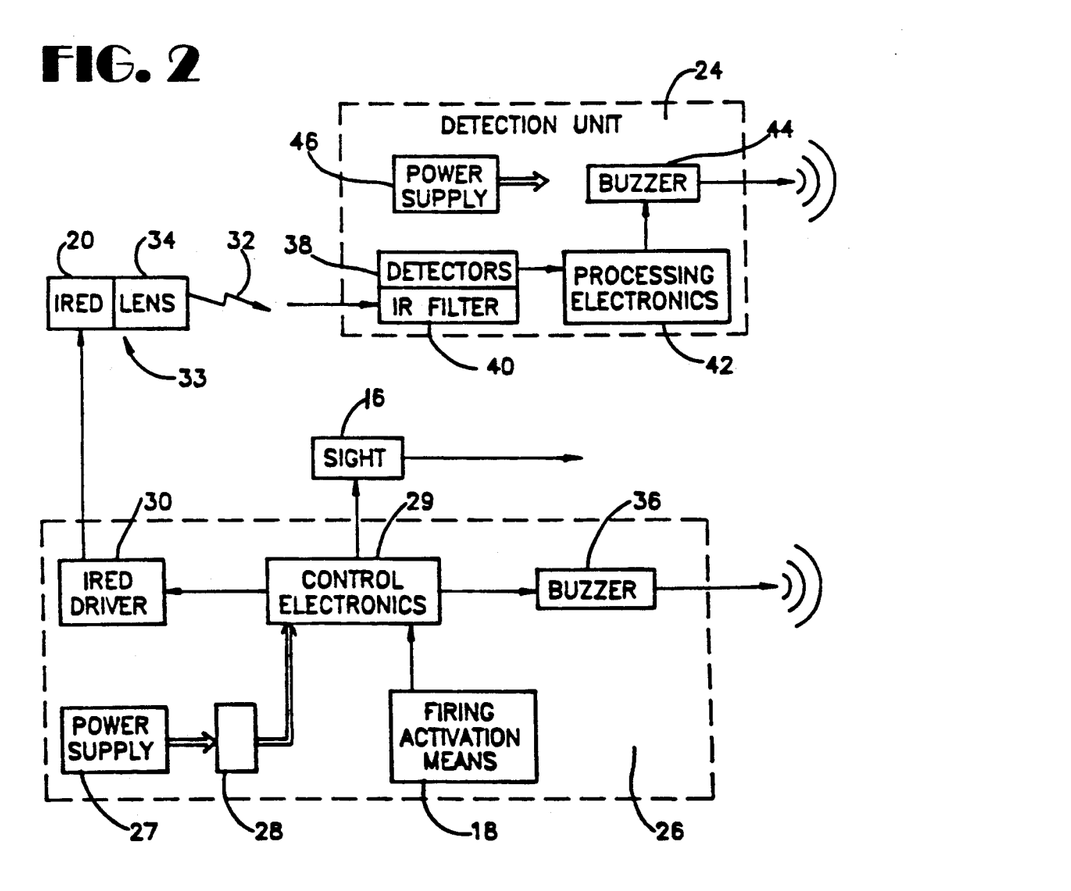
FIG. 2 is a block diagram of a detection unit and a control unit used in conjunction with the toy of FIG. 1.

Reference is now made to FIG. 2, which is a block diagram of the detection unit, referenced generally as 24, and the control unit, referenced generally as 26, both of which are used in conjunction with a firearm toy constructed and operative in accordance with a preferred embodiment of the present invention. Control unit 26 is operative to control the sighting reference and the firing functions carried out by the firearm toy. Control unit 26 is powered by a power supply unit 27, such as a set of batteries, and is activated by a switch 28 which, in turn, activates the visible light emitting diode 16, via an electronic control circuit 29, thus providing the child with a sighting reference indication.

According to a preferred embodiment, firing activation means 18 are connected to control circuit 29 which controls an IRED driver 30 driving firing unit 33. Control circuit 29 is, preferably, operative to monitor the child's firing activities so as to prevent continuous firing. Alternatively, firing activation means 18 can be connected directly to IRED driver 30.

The child "fires" upon a target by activating firing activation means 18 through speaking or by any other electrical or mechanical means. Upon activation, the activation means 18, via the control electronics 29 and the IRED driver 30, activates the firing unit 33. Firing unit 33, comprising a lens 34 and IRED 20, is operative to emit an IR light beam 32 towards the selected "target" through the lens 34. Firing activation unit 18 and IRED driver 30 are discussed in detail hereinbelow with reference to FIGS. 4 and 5, respectively. Upon "firing" of an IR light beam 32, a buzzer 36 typically rings, indicating the firing.

The described apparatus is capable of detecting "firings" of an IR light beam 32 by another child with the same or similar apparatus. Detection unit circuitry 24 typically comprises four detectors 38, typically silicon photo-diodes such as the BPX-65 manufactured by Centronics, an IR optical filter 40, such as the RG 830 manufactured by Schott, a processing unit 42, a buzzer 44, and a power supply unit 46, typically a set of batteries. The four detectors 38 detect the light beam 32 through IR optical filter 40 and are attached to the helmet 12 in such a manner that the accumulated field of view is a full 360 degrees. Processing unit 42, described in detail hereinbelow with reference to FIG. 6, analyzes the signals from the IR filter 40 and operates buzzer 44 in the event of a successful "hit".

Detection unit 22 may operate autonomously and can be disassembled from helmet 12 for use as a "practice target".

Figure 3:
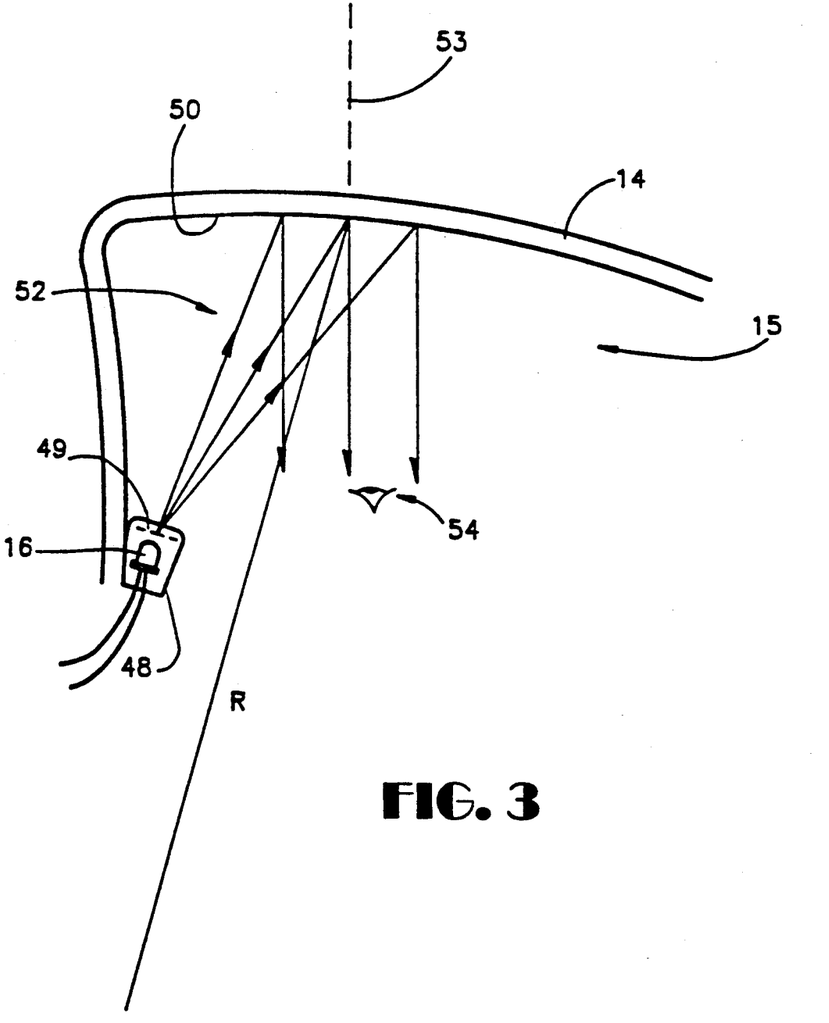
FIG. 3 is a schematic illustration of sighting reference display apparatus useful as part of the toy of FIG. 1.

Reference is now made to FIG. 3 which schematically shows a preferred embodiment of a sighting reference generating system 15 comprising a partially reflective, partially transmissive visor 14 and sighting reference generating apparatus 48. The visor 14 is, as noted above, typically an integral part of helmet 12, and is located directly in front of the child's eyes. Visor 14 is comprised of a transmissive, relatively stiff material, such as a polycarbonate, and has a pre-determined geometrical configuration, typically of a portion of a sphere. Covering the inner surface 50 of visor 14 is a partially transmissive, partially reflective coating, typically a neutral metallic coat or a dichroic type coating such as that available from Denton Vacuum of Cherry Hill, N.J.

The sighting reference generating apparatus 48 typically comprises visual light emitting diode 16 and a reticle 49 through which an image is projected on visor 14. The sighting reference generating apparatus 48 is activated by the electronic control system 29 of firing unit 26 and operates as follows. Reticle 49 is located at a pre-determined position of the focal plane of inner surface 50 such that rays of light 52, projecting from the visual light emitting diode 16, are reflected back from the coated inner surface 50 of visor 14 to the child's eye 54 in a substantially parallel manner and in the center of the child's field of view. The sighting reference is thus perceived by the child to have emanated from infinity which establishes for him a fixed line of sight 53 for aiming.

Figure 4:
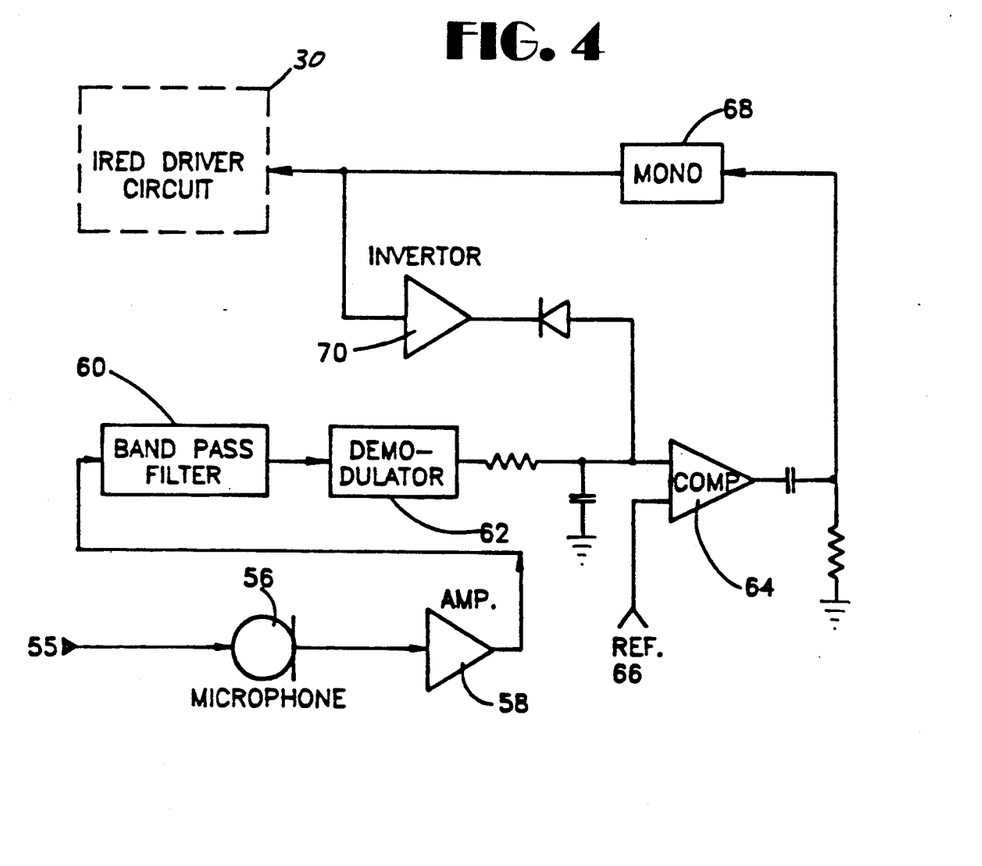

Reference is now made to FIG. 4, which illustrates an electronic circuit schematic useful in voice activation of the IRED driver 30. A child's voice signal 55 is received by a microphone 56 and amplified by an amplifier 58. A band pass filter 60 filter signal 55 which is then integrated and transformed into a D.C. signal by a demodulator 62. A comparator 64 compares the demodulator 62 output with a reference signal 66 and if a positive comparison results, activates the IRED driver 30 for a pre-determined duration, via a monostable multivibrator 68, such as an LM555 from National Semiconductor. The output of monostable 68 also returns the comparator 64 to a zero state, through inverter 70, to prepare it for another "firing".

Figure 5:
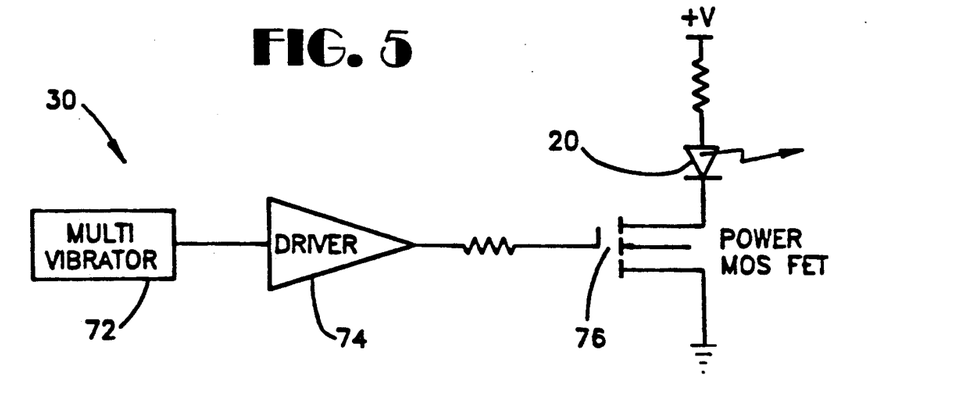

Reference is now made to FIG. 5, an electronic circuit schematic of the IRED driver 30. The IRED driver 30 circuit comprises a monostable multivibrator 72, such as an LM555 manufactured by National Semiconductor, a driver 74, such as a RCA4050 manufactured by RCA, and a power MOS FET 76, such as the IRF-521 from IR. The multivibrator 72 produces a series of pulses at a pre-determined rate and with a pre-determined pulse duration which, via the driver 74 and the power MOS FET 76 activates IRED 20 at the same rate and pulse duration.

Figure 6:
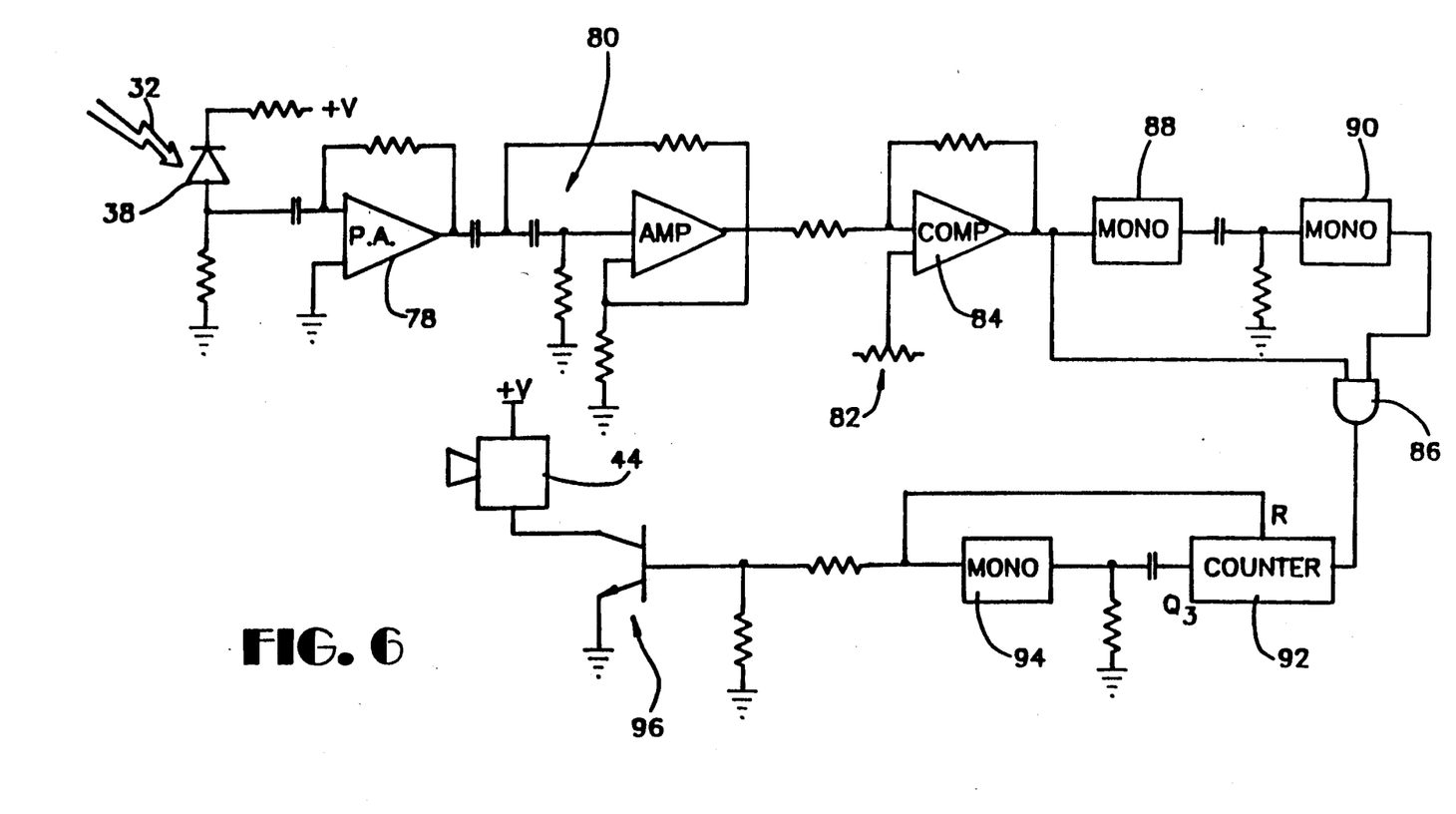
FIG. 6 is a block diagram of electronic circuitry useful in the detection unit shown in FIG. 2.

Reference is now made to FIG. 6, an electronic circuit schematic of detection unit circuitry 24. Detector 38 detects pulsed IR light beam 32, possibly corrupted by background light, from light sources such as day light and lamp light, and produces a signal to be amplified by a pre-amplifier 78. An high pass filter 80 attenuates the low frequency signals from other light sources, transmitting only the high frequency signal of the IR light beam 32. The high frequency component signal is compared to a reference signal 82 by a comparator 84, thus eliminating noise components with a lower voltage than that of reference signal 82.

The output of comparator 84 is connected to one input of an AND-GATE 86 as well as to a monostable multivibrator 88. Monostable 88 changes to a high logic state when the pulse signal from comparator 84 falls to a low logic state. Mono 88 remains in the high state for a time interval slightly shorter than the time interval between pulses of the firing IRED. A mono 90 changes to a high logic state at the moment mono 88 returns to a low logic state and stays at the high state for a time interval slightly longer than the IRED pulse duration.

The AND-GATE 86 activates the rest of the system once both the signal from the comparator 84 and the output of mono 90 are at a high logic state. The pulse duration of monos 88 and 90 are designed such that only pulses at the correct repetition rate will successfully produce a high logic state in one input of the AND-GATE at the same moment that the output pulse from the comparator 84, in the second input of the AND-GATE, is also at a high logic state.

A counter 92 counts the pulses from AND-GATE 86 and, after a pre-determined number of them, activates a monostable multivibrator 94 which, in turn, activates buzzer 44 via a transistor 96. Thus, the IR light beam 32, and only the IR light beam 32, is detected.

Figure 7:
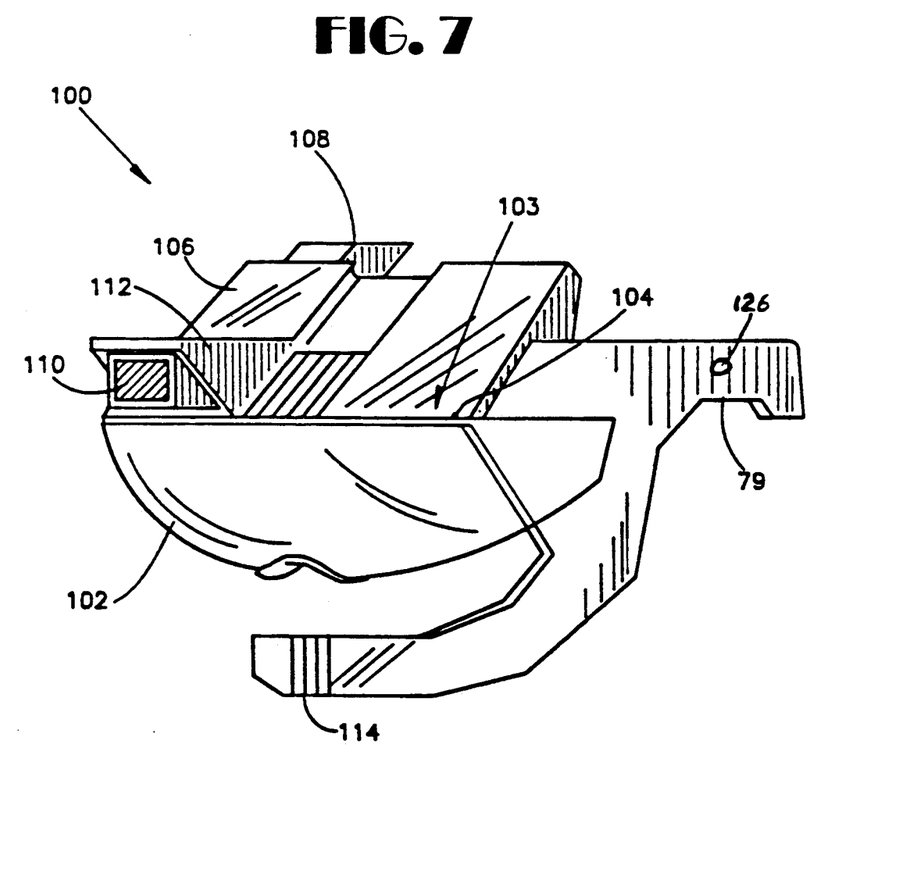
FIG. 7 is a pictorial illustration of headgear constructed and operative in accordance with a preferred embodiment of the invention which is particularly useful in the context of an interactive television game.

Reference is now made to FIG. 7, which is a pictorial illustration of headgear 100 which is particularly useful in the context of an interactive television game in accordance with a preferred embodiment of the present invention. The headgear typically comprises a partially transmissive partially reflective visor 102, which enables a player wearing the headgear to view his surroundings while at the same time, also reflecting back to him, as though from an infinite distance, a sighting reference emitted by a sighting reference generating assembly 103 including a visible light emitting diode 104 emitting via a suitable mask, not shown.

There is also provided a radiation detection assembly 106, which includes a visible light detector 108, such as a silica photodiode detector, a collimating lens 110 and a folding mirror 112. Both the sighting reference generating assembly 103 and the detection assembly 106 are boresighted with the player's line of sight to enable the player to aim onto and detect "hits" on targets appearing on the television screen.

In accordance with a preferred embodiment of the invention, when a target appears on the television screen, a player lines up the sighting reference over the target and "fires" by emitting a sound, which is picked up by a microphone 114 and in turn activates a voice-activated trigger. When a "hit" is made, the detection apparatus actuates an audio output indicating the "hit" via a sound effect speaker 126.

Figure 8:
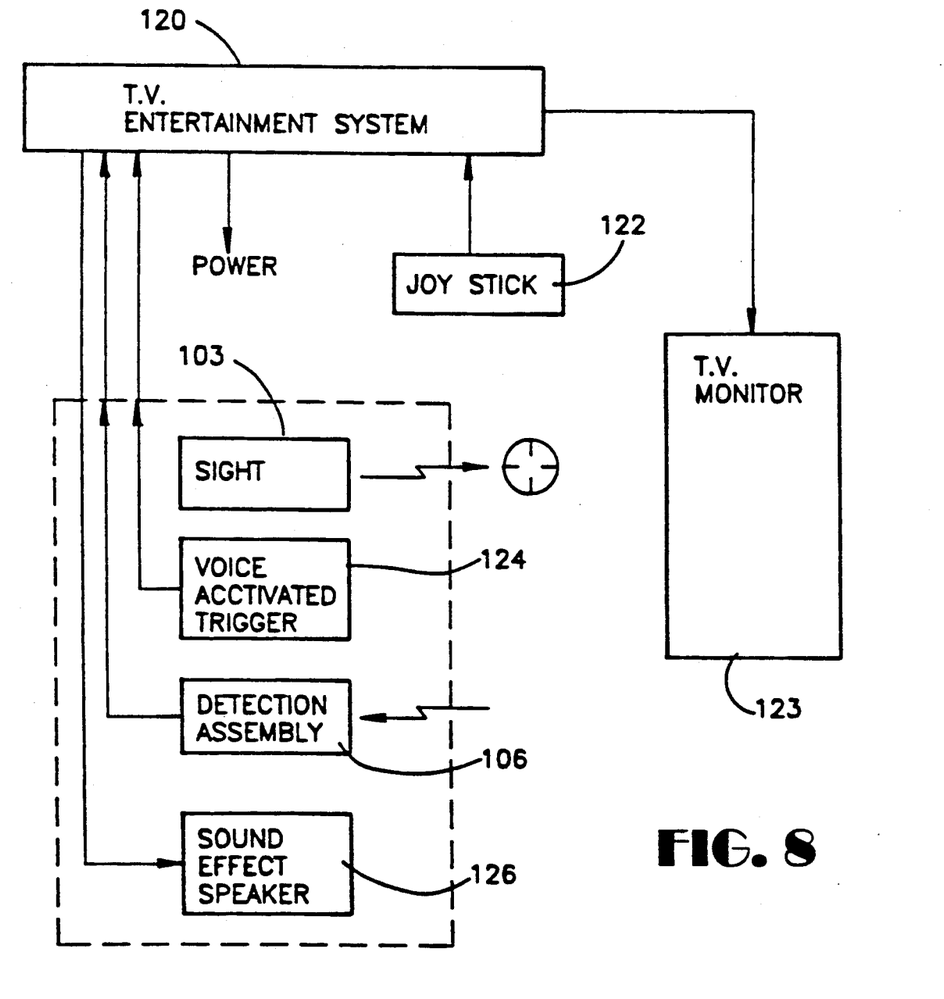
FIG. 8 is a system block diagram of an interactive television game system including the headgear of the present invention.

Reference is now made to FIG. 8, which is a block diagram illustration of an interactive television game system including, in accordance with the present invention, head gear of the type illustrated in FIG. 7 and described hereinabove.

The system of FIG. 8 includes a television entertainment system 120, such as a Nintendo (Cat No. NES-001 and associated joy-stick 122 and a television monitor 123. Plug compatible with the entertainment system 120 via either of ports 1 and 2, there is provided the apparatus of FIG. 7 which includes sighting reference generating assembly 103, a voice activated trigger assembly 124, which is described herein in detail in FIG. 10, detection assembly 106 and sound effect speaker 126.

In the NES-001 embodiment, for example, ports 1 and 2 each include a ground connector which is coupled to a corresponding ground connector of the headgear of FIG. 7, a 9 volt supply, which is connected to a 9 volt input on the headgear, a SPEAKER OUT connector which is coupled to the SPEAKER IN connector of the headgear, a FIRING IN connector which is connected to the VOICE ACTIVATED TRIGGER OUTPUT connector of the headgear, and a TARGET SENSE IN connector, which is connected to a TARGET SENSE OUT connector of the headgear.

Ports 1 and 2 also include two other connectors which may be coupled to a joy stick, if attitude control is employed in a particular game. Preferably the physical orientation of headgear 100 is operative to control the aim of the sighting reference generating assembly 103 and of the detection assembly 106. The headgear normally receives power from the entertainment system 120 to activate the light emitting diode 104 and the other subsystems in the headgear.

According to a preferred embodiment of the present invention the system 120 examines coincidence between receipt of an output of the voice activated trigger 124 and between an output of the detection assembly 106, which indicates a "hit". Upon coincidence, an output indication indicating a "hit" is provided to the sound effect speaker 126.

The detection assembly 106 preferably is operative to detect the bright area briefly defined on the target by the television scanning beams in accordance with control instructions conventionally received from system 120, provided that the player aims directly on target.

Figure 9:
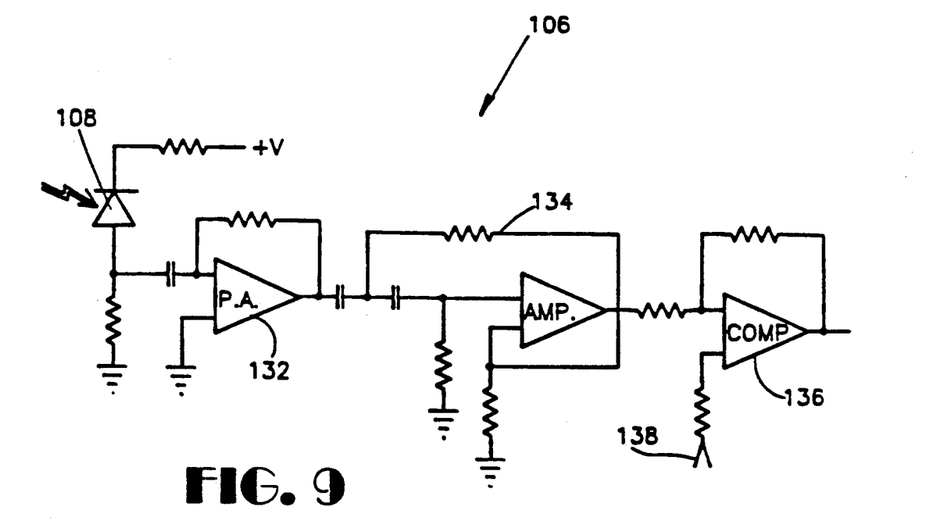
FIG. 9 is an electrical diagram of a detection unit forming part of the apparatus of FIGS. 7 and 8.

Reference is now made to FIG. 9, which is an electrical circuit schematic of a preferred detection assembly 106. The detection assembly 106 includes a preamplifier 132 which receives the output from detector 108 when it detects a bright area on a target. The output of preamplifier 132 is supplied to a filter 134 which attenuates the low frequency signals form other, spurious light sources, transmitting only the signal of the bright spot around the target. The output of filter 134 is supplied to a comparator 136, which compares it to a reference signal 138 for eliminating noise components with a voltage lower than that of reference signal 138. The output of comparator 136 is supplied to system 120 via the TARGET SENSE OUT connector mentioned above.

Figure 10:
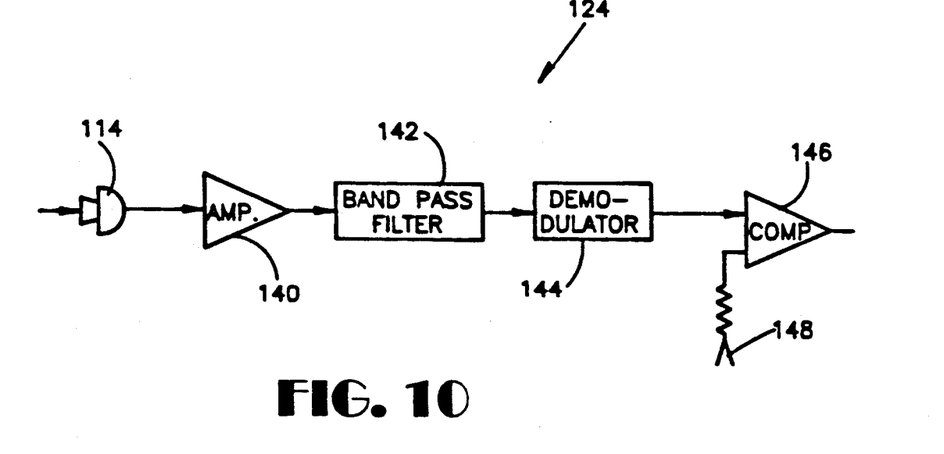
FIG. 10 is an block diagram illustration of a voice activated trigger forming part of the apparatus of FIGS. 7 and 8.

Reference is now made to FIG. 10, which illustrates a preferred construction of a voice activated trigger 124. An amplifier 140 receives an output from microphone 114, which picks up the voice of a player, and provides an output to a band pass filter 142. The band pass filter 142 outputs to a demodulator 144 which integrates the signal and transforms it to DC. A comparator 146 compares the output of the demodulator 144 with a reference signal 148. If a positive result is obtained a firing instructions is supplied to the system 120 via the VOICE ACTIVATED TRIGGER OUTPUT connector mentioned above.

It will be appreciated by persons skilled in the art that the present invention is not limited by what has been particularly shown and described hereinabove. Rather the scope of the present invention is defined only by the claims which follow:

We claim:

1. A firing toy comprising:
   headgear having mounted thereon a simulated weapon system, a visor and means for producing a sighting reference; and
   non hand held activation means for activating said simulated weapon system to produce simulated firing on a target.

2. A toy according to claim 1 and wherein said non hand activation means is mounted on said headgear.

3. A toy according to claim 2 and wherein said non hand held activation means comprises a voice activated simulated firing controller.

4. A toy according to claim 1 and also comprising detector means removably mounted on said headgear for detecting simulated hits on said target.

5. A toy according to claim 4 and wherein said detector means comprise:
   an IR sensor; and
   means for providing an output indication that IR light has impinged on said IR sensor.

6. A toy according to claim 5 and wherein said IR sensor is sensitive to IR light impinging thereupon from any direction.

7. A toy according to claim 1 and wherein said visor comprises:
   a generally transparent curved substrate; and
   a partially light reflective coating on said substrate.

8. A toy according to claim 7 and wherein said means for producing said sighting reference comprises a source of visible light for projecting said sighting reference onto said visor so that said sighting reference appears to be located at an infinite distance from a user.

9. A toy according to claim 7 and wherein said curved substrate has the shape of a portion of a sphere.

10. A toy according to claim 1 and wherein said simulated weapon system comprises an IR light emitting means.

11. A toy according to claim 10 and wherein said IR light from said IR light emitting means is boresighted to a line of sight of a user.

12. An interactive television game system comprising:
   interactive television game apparatus;
   headgear having mounted thereon a simulated weapon system, a visor and means for producing a sighting reference;
   non hand held activation means for activating said simulated weapon system to produce simulated firing on a target; and hand operated means for providing attitude control in an interactive television game.

13. An interactive television game system comprising:
   interactive television game apparatus including a screen to display at least one target;
   headgear having mounted thereon a simulated weapon system, a visor and means for producing a sighting reference;
   non hand held activation means for activating said simulated weapon system to produce simulated firing on said at least one target;
   and wherein said screen displays said at least one target as a bright area so as to be viewable by a user.

14. A system according to claim 13 and wherein said simulated weapon system is boresighted to a line of sight through said sighting reference to enable a user to aim at said at least one target.

15. A system according to claim 14 and also comprising detector means for detecting said at least one target wherein said detector means is boresighted to said line of sight such that said target is registered as hit on coincidence between activation of said simulated firing system and detection of a bright area by said detector means.

* * * * *